(12) United States Patent
Jha et al.

(10) Patent No.: US 8,845,934 B2
(45) Date of Patent: Sep. 30, 2014

(54) COMPATIBILIZED BIOPOLYAMIDE-POLY(ARYLENE ETHER) THERMOPLASTIC RESIN

(75) Inventors: Roshan Kumar Jha, Bangalore (IN); Satishkumar Mahanth, Bangalore (IN)

(73) Assignee: SABIC Global Technologies B.V., Pittsfield, MA (US)

(*) Notice: Subject to any disclaimer, the term of this patent is extended or adjusted under 35 U.S.C. 154(b) by 389 days.

(21) Appl. No.: 13/230,422

(22) Filed: Sep. 12, 2011

(65) Prior Publication Data

US 2013/0062576 A1 Mar. 14, 2013

(51) Int. Cl.
*H01B 1/24* (2006.01)
*C08L 71/00* (2006.01)
*C08L 71/12* (2006.01)
*C08L 77/06* (2006.01)
*C08L 23/08* (2006.01)

(52) U.S. Cl.
CPC .......... *C08L 77/06* (2013.01); *C08L 23/0838* (2013.01); *C08L 23/083* (2013.01); *C08L 71/12* (2013.01)
USPC ............ 252/519.34; 252/519.14; 252/519.32; 252/521.5; 252/500; 252/511; 525/92 B; 524/451; 524/449; 524/456; 524/445; 524/505; 264/176.1

(58) Field of Classification Search
CPC ............ B29C 47/00; C08K 3/34; C08K 3/40; C08L 71/02; C08L 71/12; H01B 1/24; B82Y 30/00
USPC ............... 252/519.34, 519.14, 519.32, 521.5, 252/500, 511; 525/92 B; 524/451, 449, 456, 524/445, 505; 264/176.1; 977/902
See application file for complete search history.

(56) References Cited

U.S. PATENT DOCUMENTS

| | | | |
|---|---|---|---|
| 3,306,874 A | 2/1967 | Hay et al. | |
| 4,839,425 A * | 6/1989 | Mawatari et al. | 525/92 B |
| 4,997,612 A | 3/1991 | Gianchandai et al. | |
| 5,000,897 A | 3/1991 | Chambers et al. | |
| 5,069,818 A | 12/1991 | Aycock et al. | |
| 5,859,176 A | 1/1999 | Nakahashi et al. | |
| 6,866,798 B2 * | 3/2005 | Miyoshi et al. | 252/500 |
| 2001/0031831 A1 * | 10/2001 | Miyoshi et al. | 525/138 |
| 2003/0149178 A1 * | 8/2003 | Miyoshi et al. | 525/178 |
| 2009/0043034 A1 | 2/2009 | Ishiduka et al. | |
| 2009/0211967 A1 | 8/2009 | Delsman et al. | |
| 2009/0281229 A1 | 11/2009 | Topoulos et al. | |
| 2010/0139944 A1 | 6/2010 | Guo et al. | |
| 2010/0256262 A1 * | 10/2010 | Masaki et al. | 524/9 |
| 2010/0327234 A1 | 12/2010 | Shim et al. | |
| 2012/0040115 A1 * | 2/2012 | Blondel et al. | 428/34.5 |
| 2012/0208922 A1 * | 8/2012 | Matthijssen et al. | 523/307 |

FOREIGN PATENT DOCUMENTS

| | | |
|---|---|---|
| EP | 1125985 | 8/2001 |
| WO | 2010004199 | 1/2010 |

OTHER PUBLICATIONS

International Search Report of PCT/IB2012/054277, mailed Dec. 13, 2012.

* cited by examiner

*Primary Examiner* — Douglas McGinty
(74) *Attorney, Agent, or Firm* — Honigman Miller Schwartz and Cohn LLP; Heidi M. Berven

(57) ABSTRACT

Disclosed herein are compatibilized polyamide-poly(arylene ether) thermoplastic resin compositions, comprising:
(a) about 10 to about 50 weight percent of a poly(arylene ether);
(b) about 5 percent to about 20 percent of a hydrogenated block copolymer of an alkenyl aromatic compound and a conjugated diene and a copolymer of ethylene;
(c) about 30 to about 60 percent of a biopolyamide; and
wherein all weight percents are based on the total weight of the composition; and wherein the biomass carbon content of the resin composition is at least 13 percent as measured by ASTM D6866.

Also disclosed are methods for making such resins and articles derived therefrom.

19 Claims, 1 Drawing Sheet

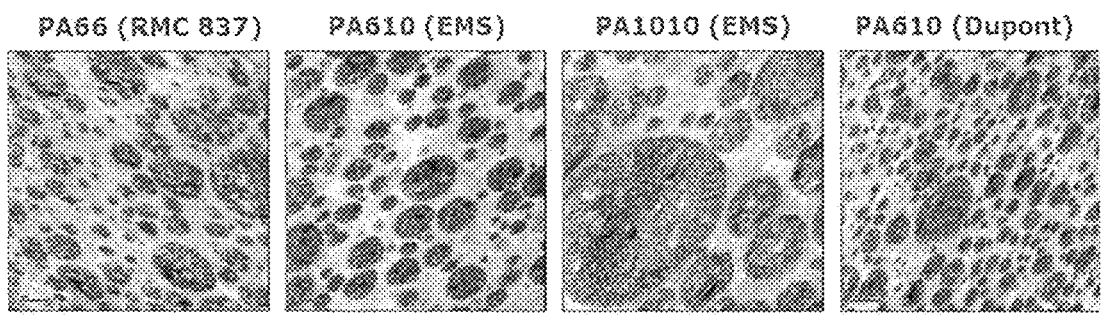

COMPATIBILIZED BIOPOLYAMIDE-POLY(ARYLENE ETHER) THERMOPLASTIC RESIN

BACKGROUND

Thermoplastic resins are widely used in a number of business sectors, including the automotive, packaging, construction, and electrical and electronic industries. Historically, these materials have been derived from petrochemical sources. More recently, societal concern regarding the environment has motivated suppliers to look to renewable resources, such as from plants and animals, to make thermoplastic resins. The use of materials from renewable resources—so called "bio-based" materials—holds the promise of reducing the environmental footprint, limiting greenhouse gas emissions, and slowing the depletion of non-renewable petroleum resources.

For example, polyamides (such as nylon) are combined with other polymeric materials to make a variety of useful thermoplastic resins. Polyamides are produced from the condensation of dicarboxylic acids with diamines. Historically, both components were derived from petrochemical resources. Today, plants and other renewable sources account for an increasing list of polyamide starting materials. The resulting polyamides are either fully or partially bio-based.

To that end, a need persists for thermoplastic resins comprising bio-based polyamides, as well as methods for making such resins and articles prepared therefrom.

SUMMARY

These and other needs are met by the present invention which is directed to a compatibilized polyamide-poly(arylene ether) thermoplastic resin composition, comprising:

(a) about 10 to about 50 weight percent of a poly(arylene ether);

(b) about 5 percent to about 20 percent of a hydrogenated block copolymer of an alkenyl aromatic compound and a conjugated diene and a copolymer of ethylene;

(c) about 30 to about 60 percent of a biopolyamide selected from the group consisting of polyamide-410, polyamide-610, polyamide-1010, polyamide 10T or mixtures thereof; and wherein all weight percents are based on the total weight of the composition; and wherein the biomass carbon content of the resin composition is at least 13 percent as measured by ASTM D6866.

The invention is also directed to a process for making such composites, as well as articles derived there from.

BRIEF DESCRIPTION OF THE DRAWINGS

FIG. 1 provides transmission electron micrographs of Comparative Example 1 and Examples 1, 3, and 5.

DETAILED DESCRIPTION

All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein weight percents are based on a 100 weight percent composition.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints are independently combinable with each other. Each range disclosed herein constitutes a disclosure of any point or sub-range lying within the disclosed range.

Components

Poly(Arylene Ether)

The composition comprises a poly(arylene ether). In some embodiments, the poly(arylene ether) used to form the composition comprises repeating structural units of the formula

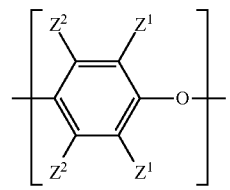

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. In some embodiments the poly(arylene ether) comprises TMDQ end groups in an amount of less than 5 weight percent, specifically less than 3 weight percent, more specifically less than 1 weight percent, based on the weight of the poly(arylene ether). In some embodiments, the poly(arylene ether) comprises, on average, about 0.7 to about 2 moles, specifically about 1 to about 1.5 moles, of chain-terminal hydroxyl groups per mole of poly(arylene ether).

The poly(arylene ether) can be in the form of a homopolymer, a copolymer, a graft copolymer, an ionomer, or a block copolymer, as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units. In some embodiments, the poly(arylene ether) is an unfunctionalized poly(arylene ether). An unfunctionalized poly(arylene ether) is a poly(arylene ether) consisting of the polymerization product of one or more phenols. The term "unfunctionalized poly(arylene ether)" excludes functionalized poly(arylene ether)s such as acid-functionalized poly(arylene ether)s and anhydride-functionalized poly(arylene ether)s. In some embodiments, the poly(arylene ether) comprises a poly(2,6-dimethyl-1,4-phenylene ether).

The poly(arylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

In some embodiments, the poly(arylene ether) has an intrinsic viscosity of about 0.2 to about 1.0 deciliter per gram, as measured by ubbelohde viscometer in chloroform at 25° C. In some embodiments, the poly(arylene ether) has an intrinsic viscosity of about 0.3 to about 0.6 deciliter per gram. When the poly(arylene ether) is a poly(2,6-dimethyl-1,4-phenylene ether), the intrinsic viscosity range of about 0.3 to about 0.6 deciliter per gram can correspond to a number average molecular weight range of about 16,000 to about 25,000 atomic mass units. The number average molecular weight and the weight average molecular weight may be determined by gel permeation chromatography and based on comparison to polystyrene standards.

In some embodiments, the composition comprises less than or equal to 2 weight percent, specifically less than or equal to 1 weight percent, more specifically less than or equal to 0.5 weight percent, of a poly(arylene ether)-polysiloxane block copolymer. In some embodiments, the composition excludes poly(arylene ether)-polysiloxane block copolymer. Poly(arylene ether)-polysiloxane block copolymers, which comprise at least one poly(arylene ether) block and at least one polysiloxane block, are described, for example, in U.S. Patent Application Publication No. US 2010/0139944 A1 (Guo et al.).

In some embodiments, the poly(arylene ether) is essentially free of incorporated diphenoquinone residues. "Diphenoquinone residues" means the dimerized moiety that may form in the oxidative polymerization reaction giving rise to the poly(arylene ethers) contemplated for use in the present invention. As described in U.S. Pat. No. 3,306,874 (Hay), synthesis of poly(arylene ethers) by oxidative polymerization of monohydric phenols yields not only the desired poly(arylene ether) but also a diphenoquinone side product. For example, when the monohydric phenol is 2,6-dimethylphenol, 3,3',5,5'-tetramethyldiphenoquinone (TMDQ) is generated. Typically, the diphenoquinone is "re-equilibrated" into the poly(arylene ether) (i.e., the diphenoquinone is incorporated into the poly(arylene ether) structure) by heating the polymerization reaction mixture to yield a poly(arylene ether) comprising terminal or internal diphenoquinone residues. As used herein, "essentially free" means that fewer than 1 weight percent of poly(arylene ether) molecules comprise the residue of a diphenoquinone as measured by nuclear magnetic resonance spectroscopy (NMR) (Mole of TMDQ× Molecular Weight of unit TMDQ)/(Mole of Polymer×Number Average Molecular Weight (Mn)). In some embodiments, fewer than 0.5 weight percent of poly(arylene ether) molecules comprise the residue of a diphenoquinone.

For example, as shown in the following Scheme, when a poly(arylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(arylene ether) with terminal and internal residues of incorporated diphenoquinone.

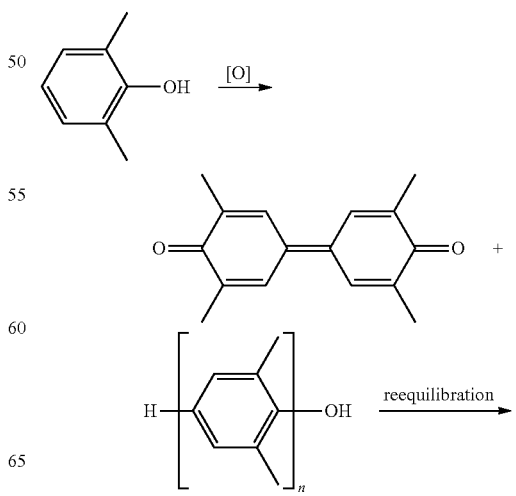

Scheme

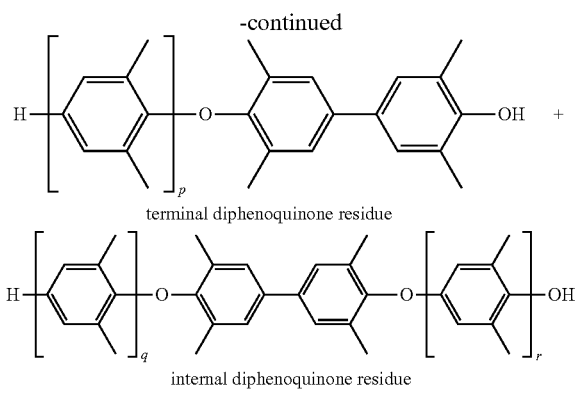

terminal diphenoquinone residue internal diphenoquinone residue

However, such re-equilibration reduces the molecular weight of the poly(arylene ether) (e.g., p and q+r are less than n). Accordingly, when a higher molecular weight and stable molecular weight poly(arylene ether) is desired, it may be desirable to separate the diphenoquinone from the poly (arylene ether) rather than re-equilibrating the diphenoquinone into the poly(arylene ether) chains. Such a separation can be achieved, for example, by precipitation of the poly (arylene ether) in a solvent or solvent mixture in which the poly(arylene ether) is insoluble and the diphenoquinone is soluble with very minimum time between end of reaction and precipitation.

For example, when a poly(arylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or methanol water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the re-equilibration of the diphenoquinone into the poly(arylene ether) chain can be minimized (e.g., by isolating the poly(arylene ether) no more than 200 minutes after termination of oxidative polymerization). These approaches are described in International patent application Ser. No. 12/255,694, published as United States Published Application 2009/0211967 (Delsman et. al.). Alternatively, diphenoquinone amounts can be achieved by removing the TMDQ formed during polymerization by filtration, specifically after stopping the oxygen feed into the polymerization reactor.

In some embodiments, the poly(arylene ether) is a poly (phenylene ether).

Hydrogenated Block Copolymer

In addition to the poly(arylene ether) and polylolefin, the composition comprises a hydrogenated block copolymer of an alkenyl aromatic compound and a conjugated diene.

The hydrogenated block copolymer may comprise about 10 to about 90 weight percent of poly(alkenyl aromatic) content and about 90 to about 10 weight percent of hydrogenated poly(conjugated diene) content. In some embodiments, the poly(alkenyl aromatic) content is about 10 to 45 weight percent, specifically about 20 to about 40 weight percent. In other embodiments, the poly(alkenyl aromatic) content is from about 45 weight percent to about 90 weight percent, and specifically from about 55 to about 80 weight percent. The hydrogenated block copolymer can have a weight average molecular weight of about 40,000 to about 400,000 atomic mass units. In some embodiments, the hydrogenated block copolymer has a weight average molecular weight of 200,000 to about 400,000 atomic mass units, specifically 220,000 to about 350,000 atomic mass units. In other embodiments, the hydrogenated block copolymer can have a weight average molecular weight of about 40,000 to less than 200,000 atomic mass units, specifically about 40,000 to about 180,000 atomic mass units, more specifically about 40,000 to about 150,000 atomic mass units. As with the poly(arylene ether) component, the number average molecular weight and the weight average molecular weight may be determined by gel permeation chromatography and based on comparison to polystyrene standards.

The alkenyl aromatic monomer used to prepare the hydrogenated block copolymer can have the structure:

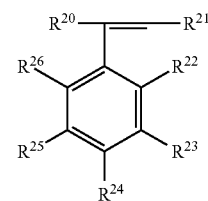

wherein $R^{20}$ and $R^{21}$ each independently represent a hydrogen atom, a $C_1$-$C_8$-alkyl group, or a $C_2$-$C_8$-alkenyl group; $R^{22}$ and $R^{26}$ each independently represent a hydrogen atom, a $C_1$-$C_8$-alkyl group, a chlorine atom, or a bromine atom; and $R^{23}$, $R^{24}$, and $R^{25}$ each independently represent a hydrogen atom, a $C_1$-$C_8$-alkyl group, or a $C_2$-$C_8$-alkenyl group, or $R^{23}$ and $R^{24}$ are taken together with the central aromatic ring to form a naphthyl group, or $R^{24}$ and $R^{25}$ are taken together with the carbons to which they are attached to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

In some embodiments, the hydrogenated block copolymer is a polystyrene-poly(ethylene-butylene)-polystyrene triblock copolymer. In some embodiments, the hydrogenated block copolymer is a polystyrene-poly(ethylene-propylene) diblock copolymer. These block copolymers do not include the residue of any functionalizing agents or any monomers other than those indicated by their names.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as Kraton G1701 and G1702; the polystyrene-poly(ethylene-butylene)-polystyrene triblock copolymers available from Kraton Polymers as Kraton G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as Kraton RP-6935 and RP-6936, the polystyrene-poly(ethylene-propylene)-polystyrene triblock copolymers available from Kraton Polymers as Kraton G1730; the maleic anhydride-grafted polystyrene-poly(ethylene-butylene)-polystyrene triblock copolymers available from Kraton Polymers as Kraton G1901, G1924, and MD-6684; the maleic anhydride-grafted polystyrene-poly(ethylene-butylene-styrene)-polystyrene triblock copolymer available from Kraton Polymers as Kraton MD-6670; the polystyrene-poly(ethylene-butylene)-polystyrene triblock copolymer comprising 67 weight percent polystyrene available from AK Elastomer as TUFTEC H1043; the polystyrene-poly(ethylene-butylene)-polystyrene triblock copolymer comprising 42 weight percent polystyrene available from AK Elastomer as TUFTEC H1051; the polystyrene-poly(butadiene-butylene)-polystyrene triblock copolymers available from AK Elastomer as TUFTEC P1000 and P2000; the polystyrene-polybutadiene-poly(styrene-butadiene)-polybutadiene block copolymer available from AK Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising about 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising about 65 weight percent polystyrene available from Kuraray as SEPTON S2104. Mixtures of two of more hydrogenated block copolymers may be used.

In some embodiments, at least a portion of the hydrogenated block copolymer is provided in the form of a melt-kneaded blend comprising hydrogenated block copolymer, an ethylene-propylene copolymer, and mineral oil, such as, for instance, TPE-SB2400, from Sumitomo. In this context, the term "melt-kneaded blend" means that the hydrogenated block copolymer, the ethylene-propylene copolymer, and the mineral oil are melt-kneaded with each other before being melt-kneaded with other components. The ethylene-propylene copolymer in this melt-kneaded blend is an elastomeric copolymer (that is, a so-called ethylene-propylene rubber (EPR)). Suitable ethylene-propylene copolymers are described below in the context of the optional ethylene/alpha-olefin copolymer. In these blends, the hydrogenated block copolymer amount may be about 20 to about 60 weight percent, specifically about 30 to about 50 weight percent; the ethylene-propylene copolymer amount may be about 2 to about 20 weight percent, specifically about 5 to about 15 weight percent; and the mineral oil amount may be about 30 to about 70 weight percent, specifically about 40 to about 60 weight percent; wherein all weight percents are based on the total weight of the melt-kneaded blend.

The composition comprises about 5 to about 65 weight percent of the hydrogenated block copolymer, based on the total weight of the composition. Within this range, the hydrogenated block copolymer amount specifically may be about 10 to about 60 weight percent, more specifically about 15 to about 55 weight percent, more specifically about 20 to about 50 weight percent, even more specifically about 25 to about 45 weight percent, still more specifically about 30 to about 40 weight percent.

The hydrogenated block copolymer and the poly(arylene ether) are present in a weight ratio of about 0.3 to about 4. In other words, the weight ratio of the hydrogenated block copolymer to the poly(arylene ether) is about 0.3:1 to about 4:1.) Within this range, the weight ratio of the hydrogenated block copolymer to the poly(arylene ether) may be specifically about 0.4 to about 3, more specifically about 0.6 to about 3, even more specifically about 0.7 to about 1.5.

Biopolyamide

In addition to the poly(arylene ether) and hydrogenated block copolymer, the composition comprises a biopolyamide. As indicated previously, polyamides have been prepared from by the condensation of dicarboxylic acids with diamines derived from petrochemical sources.

A "biopolyamide" is defined as a polyamide derived totally or in part from a renewable source, such as from a plant or animal, as determined by biobased carbon content of the biopolyamide as measured by ASTM D6866 (Standard Test Methods for Determining the Biobased Content of Natural Range Materials Using Radiocarbon and Isotope Ratio Mass Spectrometry Analysis). ASTM D6866 provides three methods for measuring organic carbon originating from renewable raw materials, referred to as biobased carbon. The proportions indicated for the polyamides of the invention are preferably measured by the mass spectrometry method or by the liquid scintillation spectrometry method described in this standard.

In consequence, the presence of $^{14}C$ in a material, regardless of the quantity involved, provides information about the origin of the molecules making it up; that is the presence of $^{14}C$ in a material indicates that a certain fraction originates from renewable raw materials and no longer from fossil materials. The measurements taken by the methods described in standard ASTM D6866 thereby serve to distinguish the monomers or starting reactants issuing from renewable materials from the monomers or reactants issuing from fossil materials.

The term "bio-based" means a compound, composition and/or other organic material that is "isotopically rich" in carbon 14 as compared to a petroleum source, as determined by ASTM D6866.

The term "bio-mass" means living and recently dead biological material which excludes organic material that has been transformed by geological processes into a member selected from the group consisting of petroleum, petrochemicals, and combinations thereof.

The term "isotopically rich" means a higher carbon 14 to carbon 12 ratio in a compound, composition and/or other organic material as compared to the carbon 14 to carbon 12 ratio from a petroleum source.

The following biopolyamides have varying levels of biobased carbon content as measured by ASTM D6866 and are commercially available.

Polyamide 10T is poly(decamethylene terephthalamide) is based to the extent of about 50% on decanediamine, a renewable raw material derived from castor beans.

Polyamide 410 (PA410) is made by polycondensation of tetramethylene diamine and sebacic acid, which is available from castor oil. PA 410 contains 70 percent biobased carbon and is available from DSM under the tradename EcoPaXX®.

Polyamide 610 (PA610) is made by polycondensation of hexamethylene diamine and sebacic acid, which is available from castor oil. PA 610 contains at least 63 percent biobased carbon and is available from the following suppliers:
  BASF, under the Tradename® Ultramid Balance;
  Evonik, under the tradename Vestamid® TerraHS;
  Dupont, under the tradename Zytel®RS LC;
  EMS-Grivory, under the tradename Grilamid® 2S;
  Rhodia, under the tradename Technyl® eXten; and
  Akro Plastik, under the tradename Akromid® S.

Polyamide 1010 (PA1010) is made by polycondensation of decamethylene diamine and sebacic acid, which is available from castor oil and contains up to 100 percent biobased carbon depending on the source of decamethylene diamine. PA 1010 is available from the following suppliers:
  EMS-Grivory, under the tradename Grilamid® 1S;
  Evonik, under the tradename Vestamid® Terra DS; and
  Dupont, under the tradename Zytel® RS LC.

Polyamide 1012 (PA1012) is made by polycondensation of decamethylene diamine and dodecanoic acid. Both components are derivable from vegetable oil and thus PA1012 may contain 45 percent, or more, biobased carbon. PA1012 is available from Evonik under the tradename Vastamid®TerraDD.

Functionalizing Agent

The polymer mixture according to the invention preferably also comprises an agent to improve the compatibility of the polyphenylene ether and the biopolyamide. Functionalizing agents that typically may be employed include citric acid, maleic anhydride, fumaric acid or derivatives thereof.

Other Additives

In addition to the constituents mentioned hereinbefore, the polymer mixture according to the invention may comprise one or more of the following constituents: fillers, electrical conductive agents, reinforcing fibers, flame retardants, stabilizers, dyes and/or pigments. The stabilizers generally known for polyamides may be used as stabilizers. In particular, the electrically conductive agent can be carbon black or carbon nanotubes, or a combination thereof. The other additives may be selected from glass fiber, talc, mica, wollastonite, clay, and flame retardants or mixtures thereof.

Composition

As indicated, disclosed herein are a compatibilized polyamide-poly(arylene ether) thermoplastic resins composition, comprising:
  (a) about 10 to about 50 weight percent of a poly(arylene ether);
  (b) about 5 percent to about 20 percent of a hydrogenated block copolymer of an alkenyl aromatic compound and a conjugated diene and a copolymer of ethylene;
  (c) about 30 to about 60 percent of a biopolyamide selected from the group consisting of polyamide-410, polyamide-610, and polyamide-10.10, polyamide 10T or mixtures thereof; and wherein all weight percents are based on the total weight of the composition; and wherein the biomass carbon content of the resin composition is at least 13 percent as measured by D6866.

In one embodiment, the hydrogenated block copolymer is a polystyrene-poly(ethylene butylene)-polystyrene block copolymer.

In another embodiment, a portion of the hydrogenated block copolymer is provided in the form of a styrene-ethylene/propylene-(styrene) polymer.

In another embodiment, the biopolyamide is Zytel® RS PA610, Grilamid® 2S (PA610), or Grilamid® 1S (PA1010).

In another embodiment, the biopolyamide has a biobased carbon content of up to 100 percent.

In another embodiment, the biopolyamide has an amine end group content of 30 to 70 meq/kg.

In another embodiment, the functionalizing agent is a dicarboxylic acid.

In another embodiment, the functionalizing agent is selected from the group consisting of citric acid and fumaric acid or mixtures thereof.

In another embodiment, the composition further comprises a stabilizer agent selected from the group consisting of potassium iodide and copper (I) iodide, or mixtures thereof.

In another embodiment, the biomass carbon content of the composition is at least 25 percent as measured by ASTM D6866.

In another embodiment, the moisture absorption of the composition is less than 1.1 weight percent at 23° C. at 50 percent relative humidity after 3750 hours.

In another embodiment, the biopolyamide is present as a continuous phase wherein the polyarylene ether and styrene polymer are dispersed individually, independently, or in a mixture thereof to form a dispersion phase having an average particle size diameter of 5 μm or less.

In another embodiment, the composition further comprising an electrically conductive agent selected from the group consisting of carbon black and carbon nanotubes, or a combination thereof.

In another embodiment, the composition of claim 1 further comprising an additive selected from the group consisting of glass fiber, talc, mica, wollastonite, clay, and flame retardants or mixtures thereof.

In another embodiment, the thermoplastic resin composition comprises:

(a) about 10 to about 50 weight percent of a poly(arylene ether);

(b) about 5 percent to about 20 percent of a hydrogenated block copolymer of an alkenyl aromatic compound and a conjugated diene and a copolymer of ethylene;

(c) about 30 to about 60 percent of a biopolyamide selected from the group consisting of a polyamide-410, polyamide-610, polyamide-1010, or mixtures thereof;

(d) about 0.1 to about 2 percent of a functionalizing agent selected from the group consisting of citric acid and fumaric acid or mixtures thereof; and (e) about 0.005 to about 0.015 percent of a stabilizer selected from the group consisting of potassium iodide and copper (I) iodide and mixtures thereof;

wherein all weight percents are based on the total weight of the composition; and wherein the biomass carbon content of the resin is at least 13 percent as measured by ASTM D6866.

In another embodiment, the composition comprises:

| Component | Weight Percent |
| --- | --- |
| Poly (arylene ether) | 32-40 |
| Functionalizing Agent | 0.5-1.5 |
| Hydrogenated Block Copolymer | 7-30 |
| Biopolyamide | 44-52 |

In another embodiment, the composition comprises:

| Component | Weight Percent |
| --- | --- |
| Poly (phenylene ether) | 32-40 |
| Functionalizing Agent | 0.5-1.5 |
| Hydrogenated Block Copolymer | 7-30 |
| Biopolyamide | 44-52 |

In another embodiment, the composition comprises:

| Component | Weight Percent |
| --- | --- |
| Poly (phenylene ether) | 32-40 |
| Fumaric Acid | 0.5-1.5 |
| Polystyrene-poly (ethylene-butylene)-polystyrene block copylymer (SEBS 1651) | 3-11 |
| Polystyrene-poly (ethylene-propylene) block copolymer (SEP 1701) | 4-12 |
| Biopolyamide PA 1010 (EMS Grivory) | 44-52 |

In another embodiment, the composition comprises:

| Component | Weight Percent |
| --- | --- |
| Poly (phenylene ether) | 32-40 |
| Fumaric Acid | 0.5-1.5 |
| SEBS 1651 | 3-11 |
| SEP 1701 | 4-12 |
| Biopolyamide PA 610 Dupont | 44-52 |

In another embodiment, the composition comprises:

| Component | Weight Percent |
| --- | --- |
| Poly (phenylene ether) | 32-40 |
| Citric Acid | 0.5-1.5 |
| SEBS 1651 | 3-11 |
| SEP 1701 | 4-12 |
| Biopolyamide PA 1010 (EMS Grivory) | 44-52 |

In another embodiment, the composition comprises:

| Component (Weight Percent) | Weight Percent |
| --- | --- |
| Poly (phenylene ether) | 32-40 |
| Citric Acid | 0.5-1.5 |
| SEBS 1651 | 3-11 |
| SEP 1701 | 4-12 |
| Biopolyamide PA 610 Dupont | 44-52 |

Process

What is also disclosed is a process for making a compatibilized polyamide-poly(arylene ether) thermoplastic resin composition, comprising:

(a) about 10 to about 50 weight percent of a poly(arylene ether);

(b) about 5 percent to about 20 percent of a hydrogenated block copolymer of an alkenyl aromatic compound and a conjugated diene and a copolymer of ethylene;

(c) about 30 to about 60 percent of a biopolyamide selected from the group consisting of a polyamide-410, polyamide-610, polyamide-1010, or mixtures thereof;

(d) about 0.1 to about 2 percent of a functionalizing agent selected from the group consisting of citric acid and fumaric acid or mixtures thereof; and (e) about 0.005 to about 0.015 percent of a stabilizer selected from the group consisting of potassium iodide and copper (I) iodide and mixtures thereof;

wherein all weight percents are based on the total weight of the composition; and wherein the biomass carbon content of the resin is at least 13 percent as measured by ASTM D6866;

wherein the process comprises:

(i) extruding a mixture comprising components (a) (b), (d), and (e);

(ii) adding component (c) added downstream to the extruding mixture of step (i).

In one embodiment of the process, the extruder is set with a barrel temperature of 150 to 285° C. with the screw rotating at 400 rotation per minute (rpm) and a vacuum of 100 millibar (mbar) to 500 mbar and a torque between 60 to 70 percent.

In another embodiment, what is disclosed is a compatibilized polyamide-poly(arylene ether) thermoplastic resin composition, comprising:

(a) about 10 to about 50 weight percent of a poly(arylene ether);

(b) about 5 percent to about 20 percent of a hydrogenated block copolymer of an alkenyl aromatic compound and a conjugated diene and a copolymer of ethylene;

(c) about 30 to about 60 percent of a biopolyamide selected from the group consisting of a polyamide-410, polyamide-610, polyamide-1010, or mixtures thereof;

(d) about 0.1 to about 2 percent of a Functionalizing Agent selected from the group consisting of citric acid and fumaric acid or mixtures thereof; and (e) about 0.005 to about 0.015 percent of a stabilizer selected from the group consisting of potassium iodide and copper (I) iodide and mixtures thereof;

wherein all weight percents are based on the total weight of the composition; and wherein the biomass carbon content of the resin is at least 13 percent as measured by D6866;

prepared by a process comprising:

(i) extruding a mixture comprising components (a) (b), (d), and (e);

(ii) adding component (c) added downstream to the extruding mixture of step (i).

Article

The disclosure includes articles, especially cable insulation, comprising any of the above-described compositions and methods for making such articles. In one embodiment, the article is an extrusion coated article or an injection molded article. IN one embodiment, the article is a jacket or cover for an electronic device, such as, for instance, a housing for a desk top or lap top computer or the like.

The disclosure also encompasses the following embodiments.

Embodiment 1

A compatibilized polyamide-poly(arylene ether) thermoplastic resin composition, comprising:

(a) about 10 to about 50 weight percent of a poly(arylene ether);

(b) about 5 percent to about 20 percent of a hydrogenated block copolymer of an alkenyl aromatic compound and a conjugated diene and a copolymer of ethylene;

(c) about 30 to about 60 percent of a biopolyamide; and wherein all weight percents are based on the total weight of the composition; and wherein the biomass carbon content of the resin composition is at least 13 percent as measured by ASTM D6866.

Embodiment 2

The thermoplastic resin of Embodiment 1 wherein the hydrogenated block copolymer is a polystyrene-poly(ethylene butylene)-polystyrene block copolymer.

Embodiment 3

The composition of Embodiment 1, wherein at least a portion of the hydrogenated block copolymer is provided in the form of a styrene-ethylene/propylene-(styrene) polymer.

Embodiment 4

The resin of Embodiment 1, wherein the biopolyamide is Zytel® RS PA610, Grilamid® 2S (PA610), or Grilamid® 1S (PA1010).

Embodiment 5

The composition of Embodiment 1, wherein the biopolyamide has a biobased carbon content of up to 100 percent.

Embodiment 6

The composition of Embodiment 1, wherein the biopolyamide has an amine end group content of 15 to 70 meq/kg.

Embodiment 7

The composition of Embodiment 1, wherein the functionalizing agent is a dicarboxylic acid.

Embodiment 8

The composition of Embodiment 1, wherein the functionalizing agent is selected from the group consisting of citric acid and fumaric acid or mixtures thereof.

Embodiment 9

The composition of Embodiment 1, further comprising a functionalizing agent selected from the group consisting of potassium iodide and copper (I) iodide, or mixtures thereof.

Embodiment 10

The composition of Embodiment 1, wherein the biomass carbon content is at least 25 percent as measured by ASTM D6866.

Embodiment 11

The composition of Embodiment 1, wherein the moisture absorption is less than 1.1 weight percent at 23° C. at 50 percent relative humidity after 3750 hours.

Embodiment 12

The composition of Embodiment 1, wherein the biopolyamide is present as a continuous phase wherein the polyarylene ether and styrene polymer are dispersed individually, independently, or in a mixture thereof to form a dispersion phase having an average particle size diameter of 5 µm or less.

Embodiment 13

The composition of Embodiment 1, further comprising an electrically conductive agent selected from the group consisting of carbon black and carbon nanotubes, or a combination thereof.

Embodiment 14

The composition of Embodiment 1 further comprising an additive selected from the group consisting of glass fiber, talc, mica, wollastonite, clay, and flame retardants or mixtures thereof.

Embodiment 15

A compatibilized polyamide-poly(arylene ether) thermoplastic resin composition, comprising:

(a) about 10 to about 50 weight percent of a poly(arylene ether);

(b) about 5 percent to about 20 percent of a hydrogenated block copolymer of an alkenyl aromatic compound and a conjugated diene and a copolymer of ethylene;

(c) about 30 to about 60 percent of a biopolyamide selected from the group consisting of a polyamide-410, polyamide-610, polyamide-1010, or mixtures thereof;

(d) about 0.1 to about 2 percent of a Functionalizing Agent selected from the group consisting of citric acid and fumaric acid or mixtures thereof; and (e) about 0.005 to about 0.015 percent of a stabilizer selected from the group consisting of potassium iodide and copper (I) iodide and mixtures thereof;
wherein all weight percents are based on the total weight of the composition; and wherein the biomass carbon content of the resin is at least 13 percent as measured by D6866.

Embodiment 16

A process for making a compatibilized polyamide-poly(arylene ether) thermoplastic resin composition, comprising:
  (a) about 10 to about 50 weight percent of a poly(arylene ether);
  (b) about 5 percent to about 20 percent of a hydrogenated block copolymer of an alkenyl aromatic compound and a conjugated diene and a copolymer of ethylene;
  (c) about 30 to about 60 percent of a biopolyamide selected from the group consisting of a polyamide-410, polyamide-610, polyamide-1010, or mixtures thereof;
  (d) about 0.1 to about 2 percent of a Functionalizing Agent selected from the group consisting of citric acid and fumaric acid or mixtures thereof; and
  (e) about 0.005 to about 0.015 percent of a stabilizer selected from the group consisting of potassium iodide and copper (I) iodide and mixtures thereof;
  wherein all weight percents are based on the total weight of the composition; and wherein the biomass carbon content of the resin is at least 13 percent as measured by D6866;
  wherein the process comprises:
    (i) extruding a mixture comprising components (a) (b), (d), and (e);
    (ii) adding component (c) added downstream to the extruding mixture of step (i).

Embodiment 17

The process of Embodiment 16, wherein the extruder was set with a barrel temperature of 150 to 285° C. with the screw rotating at 400 rotation per minute (rpm) and a vacuum of 100 millibar (mbar) to 500 mbar and a torque between 60 to 70 percent.

Embodiment 18

A compatibilized polyamide-poly(arylene ether) thermoplastic resin composition, comprising:
  (a) about 10 to about 50 weight percent of a poly(arylene ether);
  (b) about 5 percent to about 20 percent of a hydrogenated block copolymer of an alkenyl aromatic compound and a conjugated diene and a copolymer of ethylene;
  (c) about 30 to about 60 percent of a biopolyamide selected from the group consisting of a polyamide-410, polyamide-610, polyamide-1010, or mixtures thereof;
  (d) about 0.1 to about 2 percent of a Functionalizing Agent selected from the group consisting of citric acid and fumaric acid or mixtures thereof; and
  (e) about 0.005 to about 0.015 percent of a stabilizer selected from the group consisting of potassium iodide and copper (I) iodide and mixtures thereof;
  wherein all weight percents are based on the total weight of the composition; and wherein the biomass carbon content of the resin is at least 13 percent as measured by D6866;
  prepared by a process comprising:
    (i) extruding a mixture comprising components (a) (b), (d), and (e);
    (ii) adding component (c) added downstream to the extruding mixture of step (i).

Embodiment 19

An article comprising a thermoplastic resin composition, wherein the thermoplastic resin comprises:
  (a) about 10 to about 50 weight percent of a poly(arylene ether);
  (b) about 5 percent to about 20 percent of a hydrogenated block copolymer of an alkenyl aromatic compound and a conjugated diene and a copolymer of ethylene;
  (c) about 30 to about 60 percent of a biopolyamide; and
  (d) about 0.1 to about 2 percent of a Functionalizing Agent;
  wherein all weight percents are based on the total weight of the composition; and wherein the biomass carbon content of the resin is at least 13 percent as measured by ASTM D6866.

The following examples illustrate, but do not limit the invention. Any references cited herein are incorporated by reference in their entirety.

Examples

The materials used to prepare the compositions are listed in Table 1.

TABLE 1

Composition Components

| Component | Trade name and Supplier |
| --- | --- |
| PPE | Poly(2,6-dimethyl-1,4-phenylene ether) (CAS Reg. No. 25134-01-4) having an intrinsic viscosity of about 0.46 deciliter per gram and a weight average molecular weight of about 59,000 atomic mass units; obtained as PPO 646 resin or PPO 800 resin from SABIC Innovative Plastics. |
| PPE | Poly(2,6-dimethyl-1,4-phenylene ether) (CAS Reg. No. 25134-01-4) having an intrinsic viscosity of about 0.41 deciliter per gram and a weight average molecular weight of about 49,000 atomic obtained as PPO 803 resin from SABIC Innovative Plastics. |
| PA66 | A fossil fuel based polyamide 66 having Mw of approximately 66000, an Mn of approximately 27000, and an amine end group content of 52 meq/kg available from Rhodia |
| PA610 | A bio polyamide 610 having Mw of approximately 109000, an Mn of approximately 41000, and an amine end group content of 59 meq/kg and bio carbon content of approximately 62 weight percent available from Dupont |

TABLE 1-continued

Composition Components

| Component | Trade name and Supplier |
|---|---|
| PA610 | A bio polyamide 610 having Mw of approximately 110000, an Mn of approximately 35000, and an amine end group content of 38 meq/kg and bio carbon content of approximately 62 weight percent available from EMS Grivory |
| PA1010 | A bio polyamide 1010 having Mw of approximately 111000, an Mn of approximately 35000, and an amine end group content of 17 meq/kg and a bio carbon content of approximately 100 weight percent available from EMS Grivory |
| SEBS | Polystyrene-poly (ethylene-butylene)-polystyrene available as KRATON 1651 from KRATON Polymers. |
| SEP | Polystyrene-poly (ethylene-propylene) available as KRATON 1701 from KRATON Polymers. |
| Functionalizing Agent (CA) | Citric acid, CAS Reg. No. 77-92-9 from SD Fine Chemicals Ltd/Merck |
| Functionalizing Agent (FA) | Fumaric acid from SD Fine Chemicals Ltd/Merck |
| Stabilizer | KI (50 weight percent in $H_2O$) and CuI |
| Antioxidant | Octadecyl-3-(3,5-di-tert-butyl-4-hydroxyphenyl)propionate (CAS Reg. No. 2082-79-3); obtained as Great Lakes Anox PP18, Everspring Evernox 76, or Ciba Irganox 1076. |

The ISO tests used to prepare the compositions are summarized in Table 2.

TABLE 2

ISO Tests

| Test | Description |
|---|---|
| Tensile Modulus (GPa) | Tensile properties were measured according to ISO 527. Test bar dimensions were 4 × 10 × 150 mm at 23° C. and 50 percent relative humidity. |
| Tensile Strength (Mpa) | Tensile properties were measured according to ISO 527. Test bar dimensions were 4 × 10 × 150 mm at 23° C. and 50 percent relative humidity. |
| Elongation@break (%) | Tensile properties were measured according to ISO 527. Test bar dimensions were 4 × 10 × 150 mm at 23° C. and 50 percent relative humidity. |
| NII (KJ/m2) | Notched Izod impact was measured according to ISO 180/1A, "Standard Test Method for Determining the Izod Pendulum Impact Resistance of Plastics." Test bar dimensions were 4 × 10 × 10 mm at 23° C. and 50 percent relative humidity. |
| Vicat Softening VST@ 120B (C) | Vicat softening temperature was measured according to ISO 306, "Standard Test Method for Vicat Softening Temperature of Plastics." In the test, a 3.2 mm bar was used with a load of 50 N at a heating rate of 120B (120° C./h). Three samples were used for the calculation of the average. Test bar dimensions were 4 × 10 × 10 mm.. |
| CTE × $10^{-5}$ (m/m/C) | The Coefficient of Thermal Expansion (CTE) was measured according to ISO 11359-2, "Coefficient of Thermal Expansion." The start temperature is 0° C. to 80° C. at a speed of 5° C./min. One sample was used for determination in each direction flow and cross-flow. Test bar dimensions were 4 × 10 × 10. |
| Multiaxial Impact (J) | Multiaxial Impact was measured according to ISO 6603-2, "Standard Test Method for High Speed Puncture Properties of Plastics Using Load and Displacement Sensors." Test bar dimensions were 3.2 × 100 mm at 23° C. and 50 percent relative humidity. |
| Deformation (mm) | Multiaxial deformation was measured according to ISO 6603-2. |
| Moisture Abs @ 23 C. & 50% RH (weight percent) after 3750 hrs | Moisture Absorption was measured according to ISO 62, Method 4. |
| Bio content (weight percent) | The bio-carbon content was measured according to ASTM D6866-10, "Standard Test Method for Determining the Biobased Content of Solid, Liquid, and Gaseous Samples Using Radiocarbon Analysis." |

Method

The PPE/Polyamide blends were made in a 23 mm three lobe co rotating twin-screw extruder (KRUPP WERNER & PFLEIDERER EXTRUDER). PPE, SEBS, SEP, stabilizers and functionalizing agent were added at the feed throat of the extruder and the polyamide was added downstream. The extruder was set with the barrel temperature of 150 to 285° C. The material was run at 12 to 16 Kilogram per hour (kg/hr) with the screw rotating at 400 rotation per minute (rpm) and a vacuum of 100 millibar (mbar) to 500 mbar applied to the melt during compounding. The torque was maintained between 60 to 70 percent.

The pellets were then dried at 120° C. for 5 hours in a forced air-circulating oven and molded into test bars. All samples were molded via an injection molding machine set at 40 to 280° C. and mold temperature set at 100° C.

The size and distribution of PPE domains in the PA matrix was analyzed by transmission electron microscopy (TEM) using a Tecnai G2 microscope operated at 120 KV. Micrographs of typical microstructures were taken at appropriate magnifications (5800×). The 100 nm sections required for TEM studies were prepared by microtoming at room temperature using a Leica Ultracut microtome. These sections were collected on a 3 mm, 400 mesh Cu TEM grid and stained with $RuO_4$ solution for 30 seconds to induce contrast. The dispersed PPE domains are stained by $RuO_4$ and appear darker in the images. The bio-content of the formulated composition was measured per ASTM D6866-10

Results

The amounts of constituents for each of the compositions are shown in Tables 3A and 3B, along with the physical properties of molded test parts. In Table 3A, the Functionalizing Agent was fumaric acid, whereas in Table 3B, the Functionalizing Agent was citric acid. The amount of each components listed in Tables 3A and 3B is expressed in weight percent based on the total weight of the composition.

The compositions and physical properties of Examples 1, 3, and 5 and Comparative Example (CE) 1 are summarized in Table 3A. Comparative Example 1 is a composition containing the 48 weight percent of polyamide PA66, which is derived from fossil fuel. Examples 1, 3, and 5 are compositions containing 48 weight percent of a polyamide derived from a renewable source. Example 5, contained the biopolyamide Dupont 610 and have comparable notched impact energy compared to Comparative Example 1. This result is in line with the amine group content of Dupont PA610. Examples 1 and 3 showed lower impact because of the lower amine content. Each of Examples 1, 3, and 5 showed lower moisture absorption levels than Comparative Example 1, ostensibly due to the longer aliphatic chain lengths of the biopolyamides (PA610 and PA1010) as compared to PA 66.

Transmission electron micrographs of Comparative Example 1 and Examples 1, 3, and 5 are shown in FIG. 1. The continuous light gray phase corresponds to the continuous phase comprising polyamide and the dark phase corresponds to the dispersed phase comprising PPE containing styrenic impact modifiers. The micrograph shows the effect of amine content on PPE domain which varies from 0.5-15 microns

TABLE 3A

Comparative Properties of Compositions Containing Fumaric Acid

| | CE1 | Ex1 | Ex3 | Ex5 |
|---|---|---|---|---|
| Component (Weight Percent) | | | | |
| PPO 803 | 35.9 | 35.9 | 35.9 | 35.9 |
| FA | 0.7 | 0.7 | 0.7 | 0.7 |
| Stabilizer (Irganox 1076) | 0.3 | 0.3 | 0.3 | 0.3 |
| KI (50% aq soln) | 0.1 | 0.1 | 0.1 | 0.1 |
| CuI | 0.01 | 0.01 | 0.01 | 0.01 |
| SEBS 1651 | 7 | 7 | 7 | 7 |
| SEP 1701 | 8 | 8 | 8 | 8 |
| Polyamide PA66 (Rhodia) | 48 | 0 | 0 | 0 |
| Biopolyamide | 0 | 48 PA 610 (EMS Grivory) | 48 PA 1010 (EMS Grivory) | 48 PA 610 (Dupont) |
| Total | 100 | 100 | 100 | 100 |
| Properties | | | | |
| Tensile Modulus (GPa) | 1.95 | 1.7 | 1.5 | 1.7 |
| Tensile Strength (Mpa) | 50 | 46 | 44 | 47 |
| Elongation@break (%) | 61 (2.3) | 68 (18.7) | 29 (5.2) | 57 (12) |
| NII (KJ/m2) | 48.1 (0.1) | 12.7 (5.1) | 11 (2.3) | 53.7 (0.5) |
| VST@ 120B (C) | 184 | 169 | 162 | 169 |
| CTE × $10^{-5}$ (m/m/C) | 9.5 | 11 | 11.7 | 10.7 |
| MAI (J) | 109 (10) | 101 (20) | 36 (16) | 119 (7) |
| Deformation (mm) | 34.9 (8.7) | 26 (12) | 26 (14) | 29 (11) |
| Moisture Abs @ 23 C. & 50% RH (weight percent) after 3750 hrs | 1.1 | 0.64 | 0.38 | 0.64 |
| Bio content (weight percent) | Nil | — | — | — |

Table 3B summarizes the results for Comparative Example 2 and Examples 2, 4, and 6, which are identical to Comparative Example 1 and Examples 1, 3, and 5, except citric acid was used as the Functionalizing Agent instead of fumaric acid. Example 6 (like Example 5), contained the biopolyamide 610 from Dupont and gave a higher notched impact energy scored than Comparative Example 2. Examples 2 and 4 showed lower impact because of lower amine content. Examples 4 and 6 also showed a bio content as measured by ASTM D6866-10, of up to 45 weight percent and 28 weight percent, respectively, because both PA1010 and PA610 are derived from renewable sources. Examples 2, 4, and 6 showed much lower moisture absorption compared to Comparative Example 2 due to the higher aliphatic chain length of the polyamides used in those experiments, ostensibly due to the longer aliphatic chain lengths of the biopolyamides as compared to PA 66.

TABLE 3B

Comparative Properties of Compositions Containing Citric Acid

| | CE2 | Ex2 | Ex4 | Ex6 |
|---|---|---|---|---|
| Component (Weight Percent) | | | | |
| PPO 803 | 35.9 | 35.9 | 35.9 | 35.9 |
| CA | 0.7 | 0.7 | 0.7 | 0.7 |
| Stabilizer (Irganox 1076) | 0.3 | 0.3 | 0.3 | 0.3 |

TABLE 3B-continued

Comparative Properties of Compositions Containing Citric Acid

|  | CE2 | Ex2 | Ex4 | Ex6 |
|---|---|---|---|---|
| KI (50% aq soln) | 0.1 | 0.1 | 0.1 | 0.1 |
| CuI | 0.01 | 0.01 | 0.01 | 0.01 |
| SEBS 1651 | 7 | 7 | 7 | 7 |
| SEP 1701 | 8 | 8 | 8 | 8 |
| Polyamide PA66 (Rhodia) | 48 | 0 | 0 | 0 |
| Biopolyamide | 0 | 48 PA 610 (EMS Grivory) | 48 PA 1010 (EMS Grivory) | 48 PA 610 (Dupont) |
| Properties | | | | |
| Tensile Modulus (GPa) | 1.95 | 1.64 | 1.5 | 1.7 |
| Tensile Strength (Mpa) | 50 | 45 | 44 | 47 |
| Elongation@break (%) | 61 (2.3) | 100 (18) | 76 (27) | 107 (25) |
| NII (KJ/m2) | 48.1 (0.1) | 28.8 (0.4) | 15.2 (0.25) | 64.6 (1.4) |
| VST@ 120B (C) | 184 | 166 | 162 | 169 |
| CTE × $10^{-5}$ (m/m/C) | 9.5 | — | — | — |
| MAI (J) | 109 (10) | 119 (5) | 104 (9) | 131 (18) |
| Deformation (mm) | 34.9 (8.7) | 25 (9) | 28 (11) | 30 (10) |
| Moisture Abs @ 23 C. & 50% RH (weight percent) after 3750 hrs | 1.1 | 0.64 | 0.38 | 0.64 |
| Bio content (weight percent) | Nil | — | approx. 45% | approx. 28% |

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled. All patents, patent applications, and publications cited in this application are hereby incorporated by reference in their entirety for all purposes to the same extent as if each individual patent, patent application, or publication were so individually denoted. If a term in the present application contradicts or conflicts with a term in the incorporated reference, the term from the present application takes precedence over the conflicting term from the incorporated reference.

The invention claimed is:

1. A compatibilized polyamide-poly(arylene ether) thermoplastic resin composition, comprising:
   (a) about 10 to about 50 weight percent of a poly(arylene ether);
   (b) about 5 percent to about 20 percent of a hydrogenated block copolymer of an alkenyl aromatic compound and a conjugated diene and a copolymer of ethylene;
   (c) about 30 to about 60 percent of a biopolyamide selected from the group consisting of polyamide-410, polyamide-610, and polyamide-1010, polyamide 10T or mixtures thereof; and
   wherein all weight percents are based on the total weight of the composition; and wherein the biomass carbon content of the resin composition is at least 13 percent as measured by ASTM D6866.

2. The thermoplastic resin of claim 1 wherein the hydrogenated block copolymer is a polystyrene-poly(ethylene butylene)-polystyrene block copolymer.

3. The composition of claim 1, wherein at least a portion of the hydrogenated block copolymer is provided in the form of a styrene-ethylene/propylene-(styrene) polymer.

4. The resin of claim 1, wherein the biopolyamide is Zytel® RS PA610, Grilamid® 2S (PA610), or Grilamid® 1S (PA 1010).

5. The composition of claim 1, wherein the biopolyamide has a biobased carbon content of up to 100 percent.

6. The composition of claim 1, wherein the biopolyamide has an amine end group content of 15 to 70 meq/kg.

7. The composition of claim 1, wherein the functionalizing agent is a dicarboxylic acid.

8. The composition of claim 1, wherein the functionalizing agent is selected from the group consisting of citric acid and fumaric acid or mixtures thereof.

9. The composition of claim 1, further comprising a functionalizing agent selected from the group consisting of potassium iodide and copper (I) iodide, or mixtures thereof.

10. The composition of claim 1, wherein the biomass carbon content is at least 25 percent as measured by D6866.

11. The composition of claim 1, wherein the moisture absorption is less than 1.1 weight percent at 23° C. at 50 percent relative humidity after 3750 hours.

12. The composition of claim 1, wherein the biopolyamide is present as a continuous phase wherein the polyarylene ether and styrene polymer are dispersed individually, independently, or in a mixture thereof to form a dispersion phase having an average particle size diameter of 5 μm or less.

13. The composition of claim 1, further comprising an electrically conductive agent selected from the group consisting of carbon black and carbon nanotubes, or a combination thereof.

14. The composition of claim 1 further comprising an additive selected from the group consisting of glass fiber, talc, mica, wollastonite, clay, and flame retardants or mixtures thereof.

15. A compatibilized polyamide-poly(arylene ether) thermoplastic resin composition, comprising:
   (a) about 10 to about 50 weight percent of a poly(arylene ether);
   (b) about 5 percent to about 20 percent of a hydrogenated block copolymer of an alkenyl aromatic compound and a conjugated diene and a copolymer of ethylene;
   (c) about 30 to about 60 percent of a biopolyamide selected from the group consisting of a polyamide-410, polyamide-610, polyamide-1010, or mixtures thereof;
   (d) about 0.1 to about 2 percent of a Functionalizing Agent selected from the group consisting of citric acid and fumaric acid or mixtures thereof; and
   (e) about 0.005 to about 0.015 percent of a stabilizer selected from the group consisting of potassium iodide and copper (I) iodide and mixtures thereof;
   wherein all weight percents are based on the total weight of the composition; and wherein the biomass carbon content of the resin is at least 13 percent as measured by D6866.

16. A process for making a compatibilized polyamide-poly(arylene ether) thermoplastic resin composition, comprising:
   (a) about 10 to about 50 weight percent of a poly(arylene ether);
   (b) about 5 percent to about 20 percent of a hydrogenated block copolymer of an alkenyl aromatic compound and a conjugated diene and a copolymer of ethylene;

(c) about 30 to about 60 percent of a biopolyamide selected from the group consisting of a polyamide-410, polyamide-610, polyamide-1010, or mixtures thereof;
(d) about 0.1 to about 2 percent of a Functionalizing Agent selected from the group consisting of citric acid and fumaric acid or mixtures thereof; and
(e) about 0.005 to about 0.015 percent of a stabilizer selected from the group consisting of potassium iodide and copper (I) iodide and mixtures thereof;
wherein all weight percents are based on the total weight of the composition; and wherein the biomass carbon content of the resin is at least 13 percent as measured by D6866;
wherein the process comprises:
  (i) extruding a mixture comprising components (a) (b), (d), and (e);
  (ii) adding component (c) added downstream to the extruding mixture of step (i).

17. The process of claim 16, wherein the extruder was set with a barrel temperature of 150 to 285° C. with the screw rotating at 400 rotation per minute (rpm) and a vacuum of 100 millibar (mbar) to 500 mbar and a torque between 60 to 70 percent.

18. A compatibilized polyimide-poly(arylene ether) thermoplastic resin composition, comprising:
(a) about 10 to about 50 weight percent of a poly(arylene ether);
(b) about 5 percent to about 20 percent of a hydrogenated block copolymer of an alkenyl aromatic compound and a conjugated diene and a copolymer of ethylene;
(c) about 30 to about 60 percent of a biopolyamide selected from the group consisting of a polyamide-410, polyamide-610, polyamide-1010, or mixtures thereof;
(d) about 0.1 to about 2 percent of a Functionalizing Agent selected from the group consisting of citric acid and fumaric acid or mixtures thereof; and
(e) about 0.005 to about 0.015 percent of a stabilizer selected from the group consisting of potassium iodide and copper (I) iodide and mixtures thereof;
wherein all weight percents are based on the total weight of the composition; and wherein the biomass carbon content of the resin is at least 13 percent as measured by ASTM D6866;
prepared by a process comprising:
  (i) extruding a mixture comprising components (a) (b), (d), and (e);
  (ii) adding component (c) added downstream to the extruding mixture of step (i).

19. An article comprising a thermoplastic resin composition, wherein the thermoplastic resin comprises:
(a) about 10 to about 50 weight percent of a poly(arylene ether);
(b) about 5 percent to about 20 percent of a hydrogenated block copolymer of an alkenyl aromatic compound and a conjugated diene and a copolymer of ethylene;
(c) about 30 to about 60 percent of a biopolyamide; and
(d) about 0.1 to about 2 percent of a Functionalizing Agent;
wherein all weight percents are based on the total weight of the composition; and wherein the biomass carbon content of the resin is at least 13 percent as measured by ASTM D6866.

* * * * *